(12) United States Patent
Okude et al.

(10) Patent No.: US 8,682,583 B2
(45) Date of Patent: Mar. 25, 2014

(54) ROUTE SEARCH SYSTEM

(75) Inventors: Mariko Okude, Hitachi (JP); Tomoaki Hiruta, Hitachinaka (JP); Masatoshi Kumagai, Hitachi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 135 days.

(21) Appl. No.: 13/396,811

(22) Filed: Feb. 15, 2012

(65) Prior Publication Data

US 2012/0209524 A1 Aug. 16, 2012

(30) Foreign Application Priority Data

Feb. 16, 2011 (JP) .................................. 2011-030872

(51) Int. Cl.
*G01C 21/00* (2006.01)
(52) U.S. Cl.
USPC ........... 701/540; 701/409; 701/410; 701/461; 701/533; 340/995.12; 340/995.19
(58) Field of Classification Search
USPC ......... 701/400, 409, 410, 461, 532, 533, 540; 340/995.1, 995.12, 995.14, 995.19, 340/995.23
See application file for complete search history.

(56) References Cited

U.S. PATENT DOCUMENTS

| 7,587,273 | B2 * | 9/2009 | Ohnishi et al. | 701/410 |
| 8,200,432 | B2 * | 6/2012 | Uyama | 701/533 |
| 8,335,648 | B2 * | 12/2012 | Toma | 701/533 |
| 8,359,159 | B2 * | 1/2013 | Uyama | 701/453 |
| 2010/0235082 | A1 * | 9/2010 | Taniyama et al. | 701/201 |

FOREIGN PATENT DOCUMENTS

| JP | 11-64022 A | 3/1999 |
| JP | 2004-138477 | 5/2004 |
| JP | 2007-283785 | 10/2007 |

OTHER PUBLICATIONS

Japanese Office Action dated Jan. 28, 2014 with English translation.

\* cited by examiner

*Primary Examiner* — Rami Khatib
(74) *Attorney, Agent, or Firm* — Crowell & Moring LLP

(57) ABSTRACT

A route search system includes: a reception unit that receives a search request for a plurality of first routes, that are routes between all the combinations of two of a plurality of points; a search unit that, when the search request is received by the reception unit, searches the plurality of first routes based upon a search condition included in the search request; and a supply unit that transmits route information for the plurality of first routes searched by the search unit. Both a number of times the search request is received by the reception unit, and a number of times route information is transmitted by the supply unit, are smaller than a number of points in the plurality of points.

11 Claims, 10 Drawing Sheets

ROUTE SEARCH SYSTEM

INCORPORATION BY REFERENCE

The disclosure of the following priority application is herein incorporated by reference: Japanese Patent Application No. 2011-030872 filed Feb. 16, 2011.

BACKGROUND OF THE INVENTION

1. Field of the Invention

The present invention relates to a route search system that provides route information between a plurality of points.

2. Description of Related Art

In delivery schemes in the field of goods distribution, there is a trend to utilize traffic information and route services that have been developed for navigation services. Methods are under investigation for obtaining routes between delivery points with a small amount of stored data and in a short time period.

For example, a method is disclosed in Japanese Laid-Open Patent Publication H11-64022 in which representative nodes are set in a large number of small divided-up areas, and routes are calculated and stored in advance between these representative nodes. When two delivery points have been given, the closest representative node to each of these delivery points is searched, and a route between these two representative nodes that have been searched is acquired from a means that stores routes between various representative nodes that have been calculated in advance. It is described to calculate a route, for each of these two delivery points, between that delivery point and the closest representative node thereto, and to obtain a route between the two delivery points with a small amount of stored data and in a short time period by combining these routes and the route between the representative nodes.

SUMMARY OF THE INVENTION

However, since the calculation of routes between the representative nodes depends upon the number of representative nodes and the distances between the representative nodes, accordingly, if the number of representative nodes and the distances between the representative nodes increase, then a long time period is required for processing to calculate the routes.

According to the 1st aspect of the present invention, a route search system comprises: a reception unit that receives a search request for a plurality of first routes, that are routes between all the combinations of two of a plurality of points; a search unit that, when the search request is received by the reception unit, searches the plurality of first routes based upon a search condition included in the search request; and a supply unit that transmits route information for the plurality of first routes searched by the search unit. Both a number of times the search request is received by the reception unit, and a number of times route information is transmitted by the supply unit, are smaller than a number of points in the plurality of points.

According to the 2nd aspect of the present invention, in the route search system according to the 1st aspect, it is preferred that the route search system further comprises: a storage unit that, when each route of the plurality of first routes are searched by the search unit, stores route correspondence information related to a second route, that is either a route section from a first candidate node through which the each route of the first routes passes to a second candidate node through which the each route of the first routes passes, or a route section from the first candidate node to a destination of the each route of the first routes, in correspondence with the search condition; and a search unit that, after the route correspondence information has been stored by the storage unit, and when the each route of the plurality of the first routes is searched by the search unit and the each route of the plurality of the first routes include a second route, refers to the storage unit and searches the route correspondence information. The search unit searches for the plurality of first routes based upon the search condition and the route correspondence information.

According to the 3rd aspect of the present invention, in the route search system according to the 2nd aspect, it is preferred that the route search system further comprises an acquisition unit that acquires a departure date and time and traffic information from an external server. The search condition includes a condition that the plurality of first routes are searched based upon the traffic information corresponding to the departure date and time.

According to the 4th aspect of the present invention, in the route search system according to the 3rd aspect, it is preferred that the acquisition unit, along with acquiring the traffic information corresponding to the departure date and time, acquires the traffic information corresponding to a predicted time point of passing through each point of the plurality of the points; and the search condition includes a condition that the plurality of first routes are to be searched based upon the traffic information corresponding to the departure date and time and the traffic information corresponding to the predicted time point of passing through the each point of the plurality of points.

According to the 5th aspect of the present invention, in the route search system according to the 4th aspect, it is preferred that the route search system further comprises a deletion unit that, when the traffic information corresponding to the departure date and time has been acquired by the acquisition unit, deletes the route correspondence information stored by the storage unit. The storage unit newly stores the second route in correspondence with the search condition.

According to the 6th aspect of the present invention, in the route search system according to the 4th aspect, it is preferred that the traffic information includes statistical traffic information.

According to the 7th aspect of the present invention, in the route search system according to the 6th aspect, it is preferred that the statistical traffic information is structured according to type of day; and the search condition includes a condition that the plurality of first routes are searched based upon the statistical traffic information structured according to the type of day.

According to the 8th aspect of the present invention, in the route search system according to the 2nd aspect, it is preferred that the search condition includes a plurality of conditions including a road classification condition, a road width condition, and a number of road lanes condition; the search unit searches for the second route that corresponds to each condition of the plurality of conditions; and the search unit searches for the plurality of first routes based upon the each condition.

According to the 9th aspect of the present invention, in the route search system according to the 2nd aspect, it is preferred that the route correspondence information includes second route cost information for the second route; and the search unit, based upon the search condition and the route correspondence information, along with searching for the plurality of first routes, solves a first route cost for the each route of the plurality of first routes.

According to the 10th aspect of the present invention, in the route search system according to the 9th aspect, it is preferred that the route correspondence information includes the second route and cost information for the second route; and the search unit solves a third route for a section from a departure point of the each route of the plurality of first routes to the first candidate node and a third route cost of the third route based upon the search condition and the route correspondence information, and, based upon the second route and the second route cost information for the second route and based upon the third route and the third route cost for the third route, along with searching for the plurality of first routes, solves the first route cost for the each route of the plurality of the first routes.

According to the 11th aspect of the present invention, in the route search system according to the 1st aspect, it is preferred that the route search system further comprises a correspondence establishment unit that establishes correspondence between the plurality of points and a plurality of road nodes respectively. The search unit, based upon the search condition, along with searching for a fourth route between two of the plurality of road nodes, searches for a fifth route from a point established in correspondence with each node of the two nodes by the correspondence establishment unit to a link on which the each node is positioned or to the each node, and, by correcting the fourth route based upon the fifth route, along with searching for each of the plurality of first routes, solves a cost of the each of the plurality of first routes.

According to the 12th aspect of the present invention, in the route search system according to the 11th aspect, it is preferred that the correspondence establishment unit establishes a correspondence to one road node of a portion of the plurality of points, which are close to one another.

DESCRIPTION OF THE PREFERRED EMBODIMENTS

First Embodiment

In the following, a first embodiment of the present invention will be explained in detail with reference to the drawings.

Figure 1:
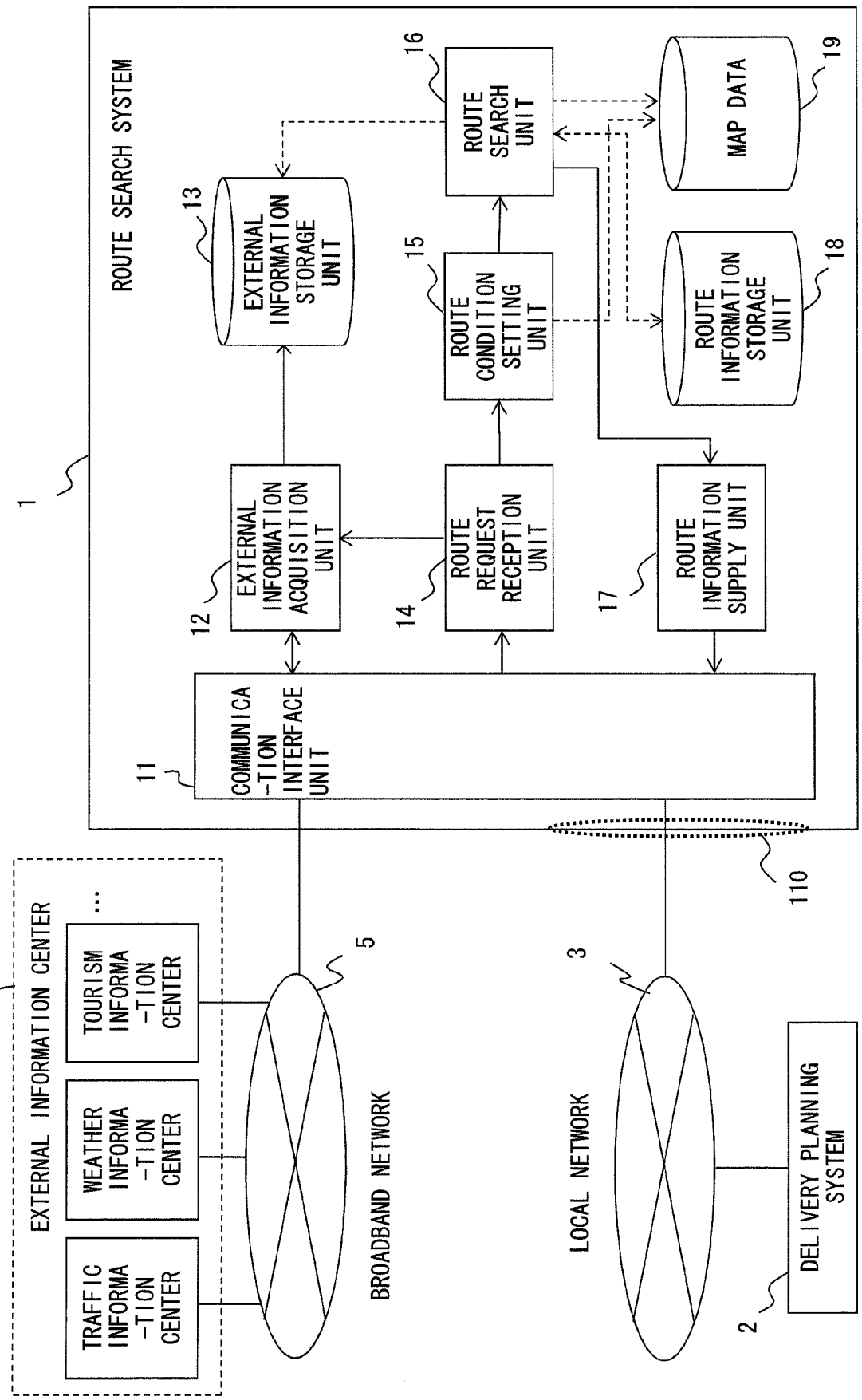
FIG. 1 is a figure showing the overall structure of a route search system according to a first embodiment of the present invention.

FIG. 1 is a figure showing the overall structure of a route search system 1 according to a first embodiment of the present invention. In FIG. 1, the route search system 1 according to this embodiment is connected to a delivery planning system 2 via a local network 3. Moreover, it is also connected via a broadband network 5 to an external information center 4 such as a traffic information center, a weather information center, a tourism information center, or the like.

The route search system 1 includes an information processing device such as a computer that includes a CPU (Central Processing Unit), a memory, and a hard disk or the like. Functionally, as shown in FIG. 1, this route search system 1 includes functional blocks such as a communication interface unit 11, an external information acquisition unit 12, an external information storage unit 13, a route request reception unit 14, a route condition setting unit 15, a route search unit 16, a route information supply unit 17, a route information storage unit 18, map data 19, and so on. It should be understood that these functional blocks are implemented by the CPU of the route search system 1 executing a program that is stored in a semiconductor memory or a hard disk device.

In FIG. 1, the external information acquisition unit 12 acquires information of various types (including audio information and video information) such as traffic information, weather information, facility information and so on from the external information center 4, and accumulates this information in the external information storage unit 13. And the route request reception unit 14 receives route requests transmitted from the delivery planning system 2.

If a search condition such as priority for normal roads, priority for high speed roads, or the like is included in a route request that has been received, then the route condition setting unit 15 sets this search condition as a route search condition for searching for a route from the departure point to a destination group. The route condition setting unit 15 matches the position information for a plurality of points included in the route request to road nodes or road links stored in the map data 19. And the route condition setting unit 15 selects a departure point from among the above described plurality of points, takes all the points except the departure point as a destination group, and generates search point information constituted of this departure point and this destination group using the position information upon the map that has been matched (node numbers or link numbers). And, if a date/time of departure or a subject region to be searched is included in the route request, then a route condition is also set in a similar manner.

Using the map data 19, and on the basis of the departure point and the destination group set by the route condition setting unit 15, the route search unit 16 calculates routes from the departure point to the destinations. Here, the route condition setting unit 15 selects departure points in order until all of the plurality of points included in the route request have been chosen as departure points, generates search point information constituted of the departure points and the destination group, and requests the route search unit 16 to search routes from the departure points to the destinations.

The route information storage unit 18 stores routes between nodes and traveling costs solved by the route calculation performed by the route search unit 16. The route information stored by the route information storage unit 18 is cancelled when traffic information is acquired from the external information center 4 via the external information acquisition unit 12 and the external information storage unit 13 is updated. When route information calculated using information of various types acquired from the external information storage center, such as weather or information about facilities or the like, is stored by the route information storage unit 18, then route information is cancelled at the timing that the information used in the calculation of the route information is newly acquired and the external information storage unit 13 is updated. The route information supply unit 17 transmits the information relating to routes between the plurality of points outputted by the route search unit 16 to the delivery planning system 2.

While, in this embodiment, it is arranged for the route search system 1 and the delivery planning system 2 to be connected together via a local network, it would also be acceptable to arrange for the route search system 1 and the delivery planning system 2 not to be connected together via a network, but rather to be implemented upon the same computer.

Figure 2:
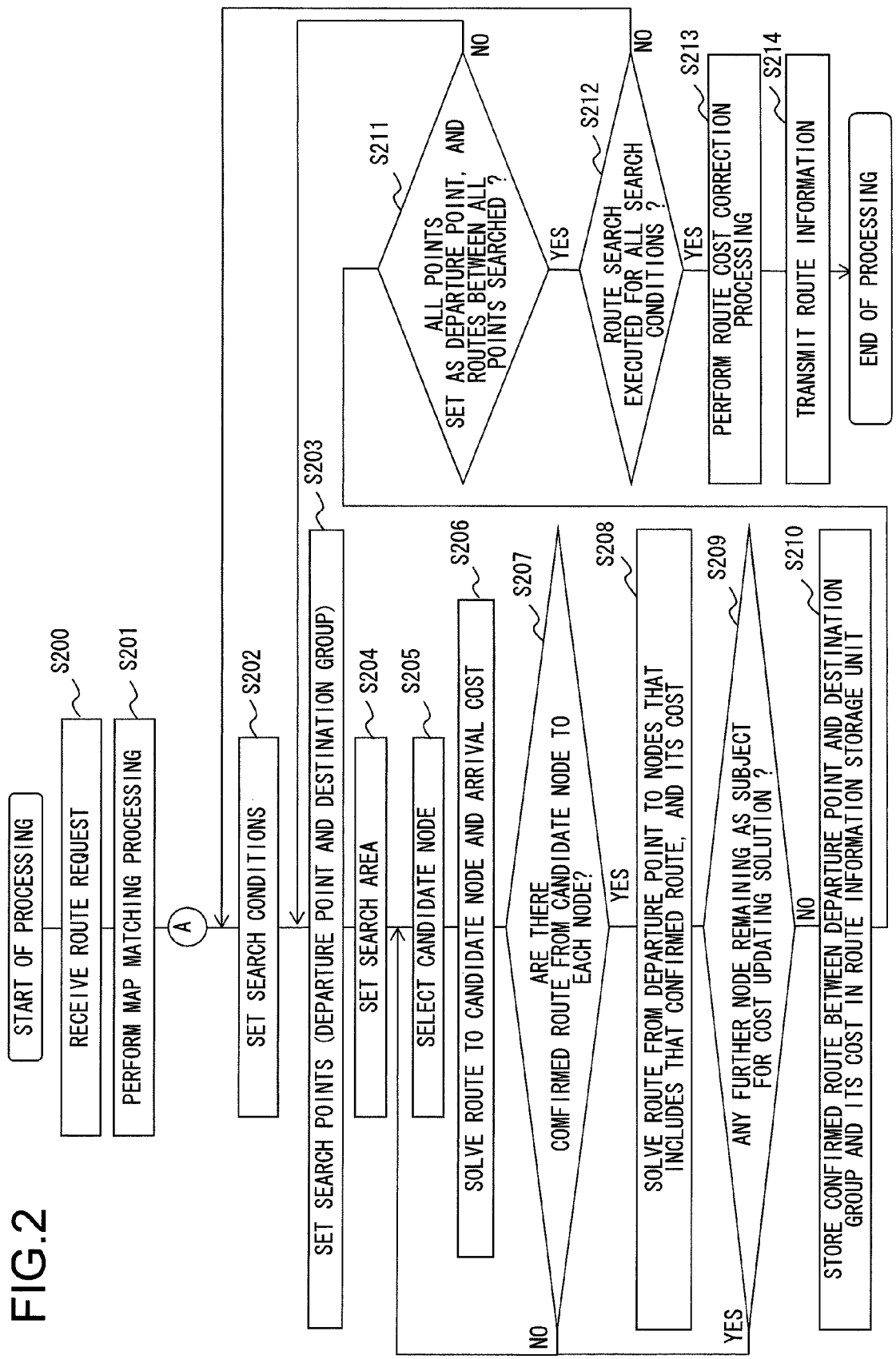
FIG. 2 is a figure showing the overall processing flow of this route search system.

The overall processing flow of this route search system is shown in FIG. 2. The route search system 1 receives a route request from the delivery planning system 2, refers to the position information for the plurality of points included in the route request and to the search conditions and so on, and calculates a route between this plurality of points. In the following, the processing sequence executed when the route search system 1 has received a route request from the delivery planning system 2 will be explained.

In the route search system 1, the route request reception unit 14 receives a route request via the communication interface unit 11, in which position information for a plurality of points and one or more search conditions are included (a step S200). And the route condition setting unit 15 executes map matching processing in which correspondence is established between the positions of the plurality of points and the positions of road nodes or links managed by the map data 19 (a step S201). The route condition setting unit 15 interprets the search conditions included in the route request, for example a search condition related to road classification such as priority for high speed roads or the like, a search condition related to road width, a search condition related to the number of road lanes, a search condition for whether the search cost should give priority to time or should give priority to distance, or the like, and sets search conditions for route search based upon the search conditions that have been interpreted (a step S202).

Using the position data in the map data 19 matched in the step S201, the route condition setting unit 15 selects a departure point from among the plurality of points described above, and takes the plurality of points except for this departure point as a destination group (a step S203). And the route search unit 16 sets a search area so that the departure point and the destination group are included (a step S204), selects a candidate node from this search area (a step S205), and solves a route to arrive from the departure point at this candidate node and the cost of that attained route (a step S206). Then, by searching the route information storage unit 18, the route search unit 16 makes a decision as to whether or not confirmed routes to the nodes exist in which the candidate node is taken as the starting point, and that moreover correspond to the search conditions that have been set. If such confirmed routes exist (YES in the step S207), then the route search unit 16 performs a calculation to combine the attained route from the departure point to the candidate node and the cost of that attained route, and the confirmed routes from the candidate node to the nodes described above and the cost of these confirmed routes, and thereby solves attained routes from the departure point to the nodes described above and the costs of these attained routes (a step S208).

The route search unit 16 updates and selects the candidate node (the step S205) until no further node exists within the subject area to be the subject of cost updating solution (a step S209), and repeats the processing from the step S206 to the step S208. And when cost updating solution processing has been completed for all of the nodes within the search area (NO in the step S209), then the route search unit 16 stores the confirmed routes from the departure point to the nodes and the costs of these confirmed routes in the route information storage unit 18 (a step S210). The updating and setting of the departure point and the destination group (in the step S203) and the processing from the step S204 to the step S210 by the route search unit 16 are repeated, until the route condition setting unit 15 has set all of the plurality of points described above as the departure point, and route information between all of the points has been obtained by the route search unit 16 (YES in a step S211).

When the route search between the above described plurality of points by the route search unit 16 ends (YES in the step S211), and if different search conditions from those set by the route condition setting unit 15 in the step S202 are included in the route request that was received by the route request reception unit 14 in the step S200 and route calculation with all of these search conditions is not ended (NO in a step S212), then the route condition setting unit 15 updates and sets the search conditions (in the step S202), and the processing of the step S203 and subsequently is repeated. But if route information between the above described plurality of points has been acquired with all of the requested search conditions (YES in the step S212), then, since the cost of the route that has been acquired is the cost between the search points (i.e. between the road nodes), accordingly the route search unit 16 calculates the cost from the original point to the search points (the nodes) (this will be explained using FIG. 8), and corrects the cost of each of the routes (a step S213). And the route information supply unit 17 takes the route information for which the route search unit 16 has completed correction of the route cost as being route information in response to the route request that was received in the step S200, and transmits this via the communication interface unit 11 to the delivery planning system 2 that was the source of the route request.

Since position information for a plurality of points is included in the route request that is received just once by the route search system 1 in the step S200, accordingly it is not the case that a number N of route requests are received, as was the case in the prior art, which is equal to the number N of combinations of departure point and destination selected from among that plurality of points. In a similar manner, since a route number N of routes equal to the above described combination number N are included in the single item of route information that the route search system 1 transmits once in the step S214, accordingly it is not the case that route information is transmitted a number of times N, as was the case in the prior art, which is equal to this number of routes. In other words, with this route search system of FIG. 1, the processing load upon the delivery planning system 2 and the interface 110 is reduced, since the number of times a route request is received and the number of times route information is transmitted are both once only.

If the amount of data in the route request is large, then it would be acceptable for the number of times a route request is received not to be limited to only once, but to be a plural number of times smaller than N times. Since, in this case, the amount of data in the route information also becomes large, while the number of times of transmission of route information also may not be only once but may perhaps become a plurality of times, if the number of times of transmission of route information is smaller than N times, then it is possible to obtain the above described beneficial effect of reduction of the processing load. Moreover, it would also be acceptable for the number of times of transmission of route information in response to a single route request not to be limited to once, but to be a plurality of times.

The map matching processing by the route search system 1 (i.e. the step S201) will now be explained with reference to FIGS. 3 and 4.

Figure 3:
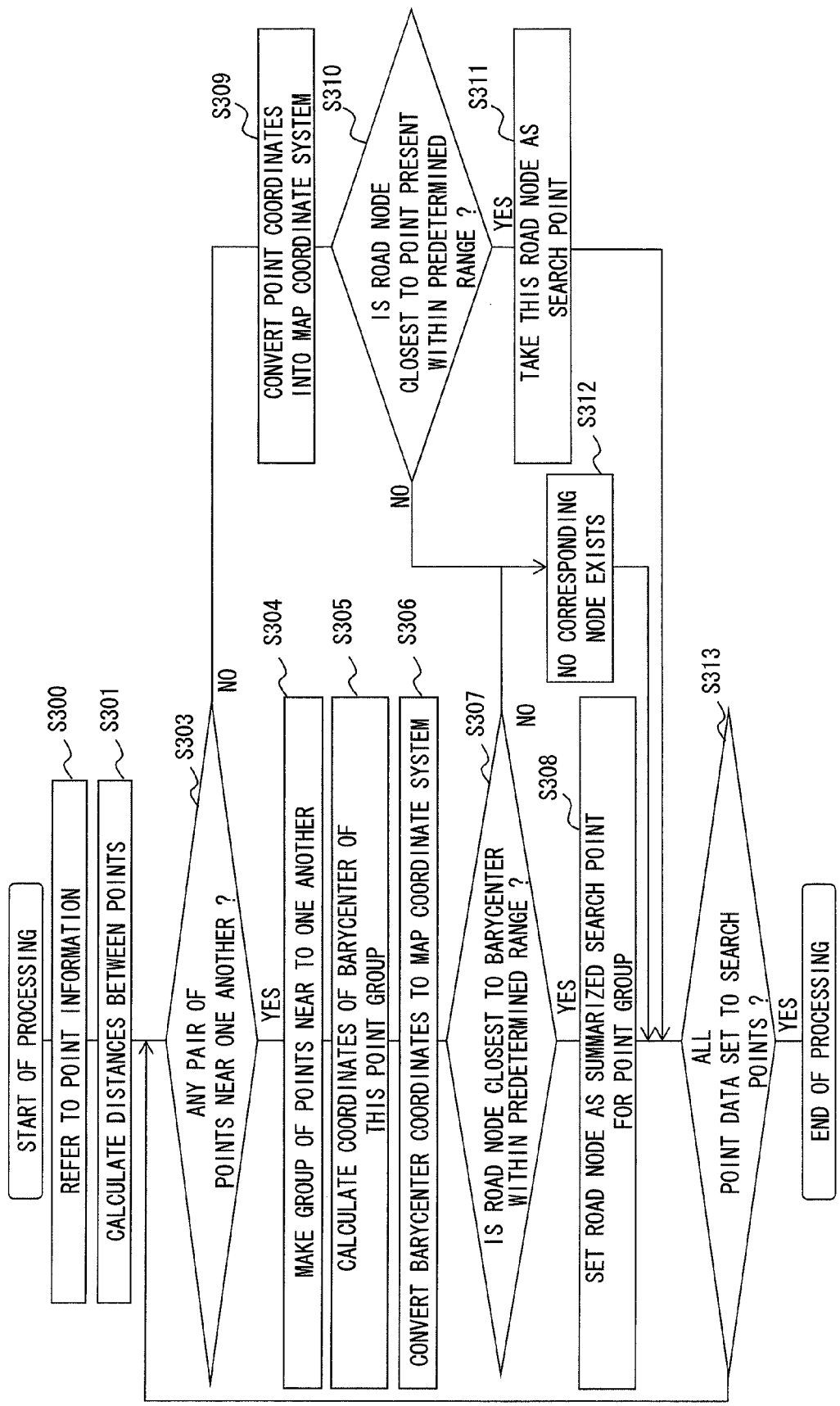
FIG. 3 is a figure showing an example of a map matching processing flow performed by the route search system.

FIG. 3 is a figure showing an example of the flow of map matching processing performed by the route search system 1. And FIG. 4 is a supplementary figure for explaining this map matching processing flow performed by the route search system 1.

This processing is executed by the route condition setting unit 15 that performs route search from the route request received by the route request reception unit 14. The route condition setting unit 15 refers to the position information for the plurality of points included in the route request (a step S300), and calculates the distances (for example the Euclidean distances) between the various points using this position information (a step S301). While latitude and longitude are generally used as this position information, provided that the coordinate system is clear, it would also be acceptable to designate positions by information that indicates identification numbers of areas handled by the coordinate system (for example, map mesh codes) and normalized coordinates. If some distance between the plurality of points is less than a predetermined value, in other words if some of the points are near to one another (YES in a step S303), then the route condition setting unit 15 extracts those points that are near to one another and makes them into a point group (a step S304). And the route condition setting unit 15 calculates the coordinates of the barycenter of the point group that has been made from its positional coordinates (a step S305), and converts the barycenter coordinates that have been obtained by this calculation to the coordinate system in which the map data 19 is handled (a step S306).

Then, from the map data 19, the route condition setting unit 15 takes the road node or road link that is closest to the converted barycenter coordinates (a step S307). It is arranged to limit the search range for a road node to within a predetermined range, in order to prevent correspondence being established with a road node that is further than a predetermined distance from the position where the point group is located. Thus, if some road node has been searched that satisfies the condition of being within the predetermined range (YES in the step S307), then the route node setting unit 15 establishes a correspondence of the points that make up the above described point group with that road node, and sets the road node that has been obtained by establishing this correspondence as a summarized search point for the point group (a step S308). But if in the step S307 no road node has been searched that satisfies the condition of being within the predetermined range (NO in the step S307), then the route node setting unit 15 determines that no corresponding node exists (a step S312), and does not include this point group in any search point.

If no pair of points included in the plurality of points included in the route request are located close to one another (NO in the step S303), then the route condition setting unit 15 converts a point in the neighborhood of which no other point is present into the coordinate system of the map data 19 (a step S309), and if some road node is present within a predetermined range of the converted point coordinate neighborhood (YES in a step S310), then it sets that road node as a search point for that point (a step S311). And, when search points have been set for all of the points by performing establishment of correspondence to road nodes (YES in a step S313), then the route condition setting unit 15 terminates this map matching processing.

Figure 4:
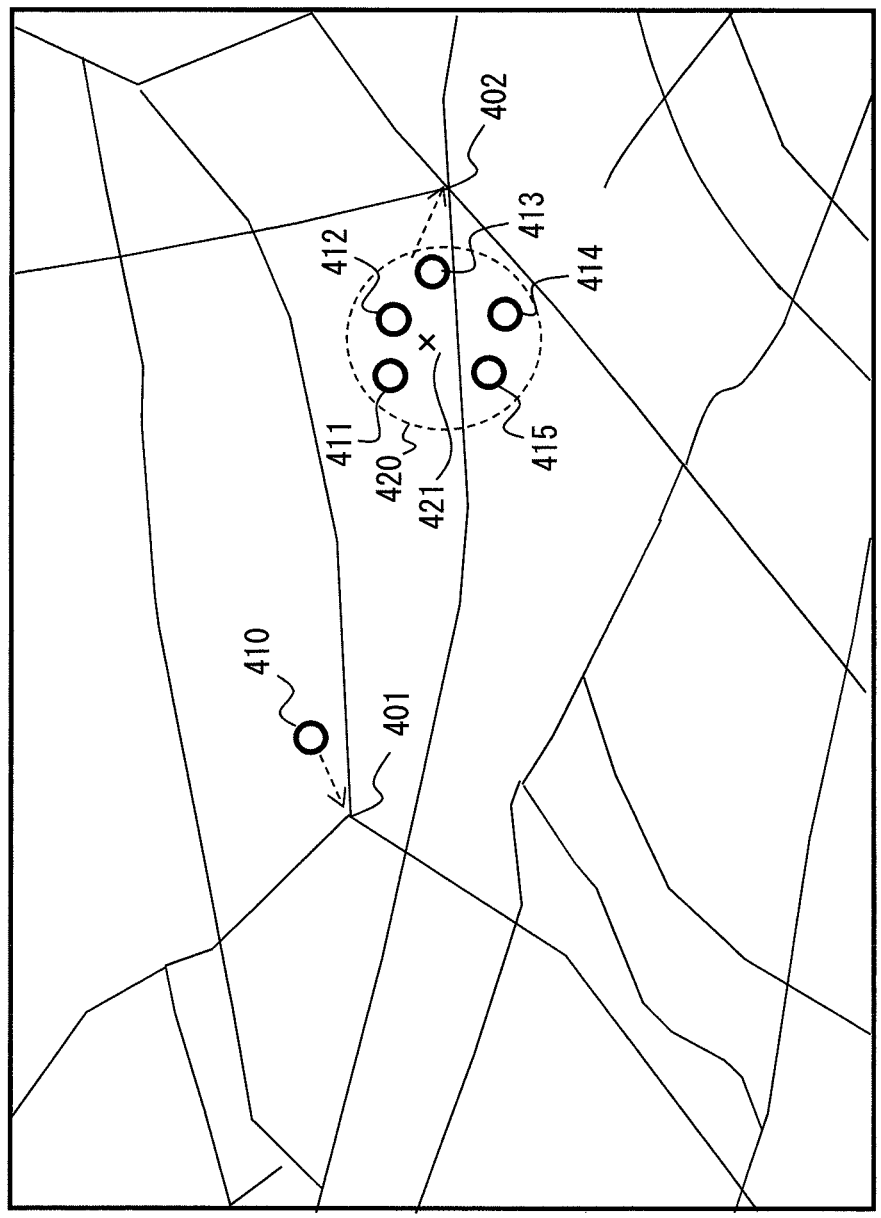
FIG. 4 is a supplementary figure for explaining this map matching processing flow performed by the route search system.

In FIG. 4, the points 411 through 415 are points that are in mutual proximity to one another, and points of this type are handled together as a point group 420. The coordinates of the barycenter 421 of this point group 420 are calculated in the steps S305 and S306 shown in FIG. 3, the road node 402 that is closest to the coordinates of the barycenter 421 is taken as the search point for this point group 420, and, with the present invention, this type of search point is taken as being a summarized search point. Since no neighboring point exists for the point 410, accordingly the road node 401 is put into correspondence with the point 410 in the steps S309 through S311, and this road node 410 is set as its search point.

The positional information for the points included in a route request does not necessarily agree with the road data handled by route search; there is a possibility that a plurality of points may be included corresponding to the same road node (or to the same road link) as search points on a road specified by the road data. While properly a plurality of search points must exist corresponding to the plurality of points, if this plurality of search points all agree with the same search point, then it is possible to reduce the total number of search points by handling the same search point as a summarized search point in which this plurality of search points that properly should exist are all taken together as one, and thereby it is possible to shorten the time needed for search processing. While, in the explanation of this embodiment, the method is shown of calculating the coordinates of the barycenter of a plurality of neighboring points and setting this as the search point, a similar beneficial effect would also be obtained by, after having established correspondence between the points included in the past request with road nodes, taking a plurality of points that are in correspondence with the same road node as being a point group.

Figure 5:
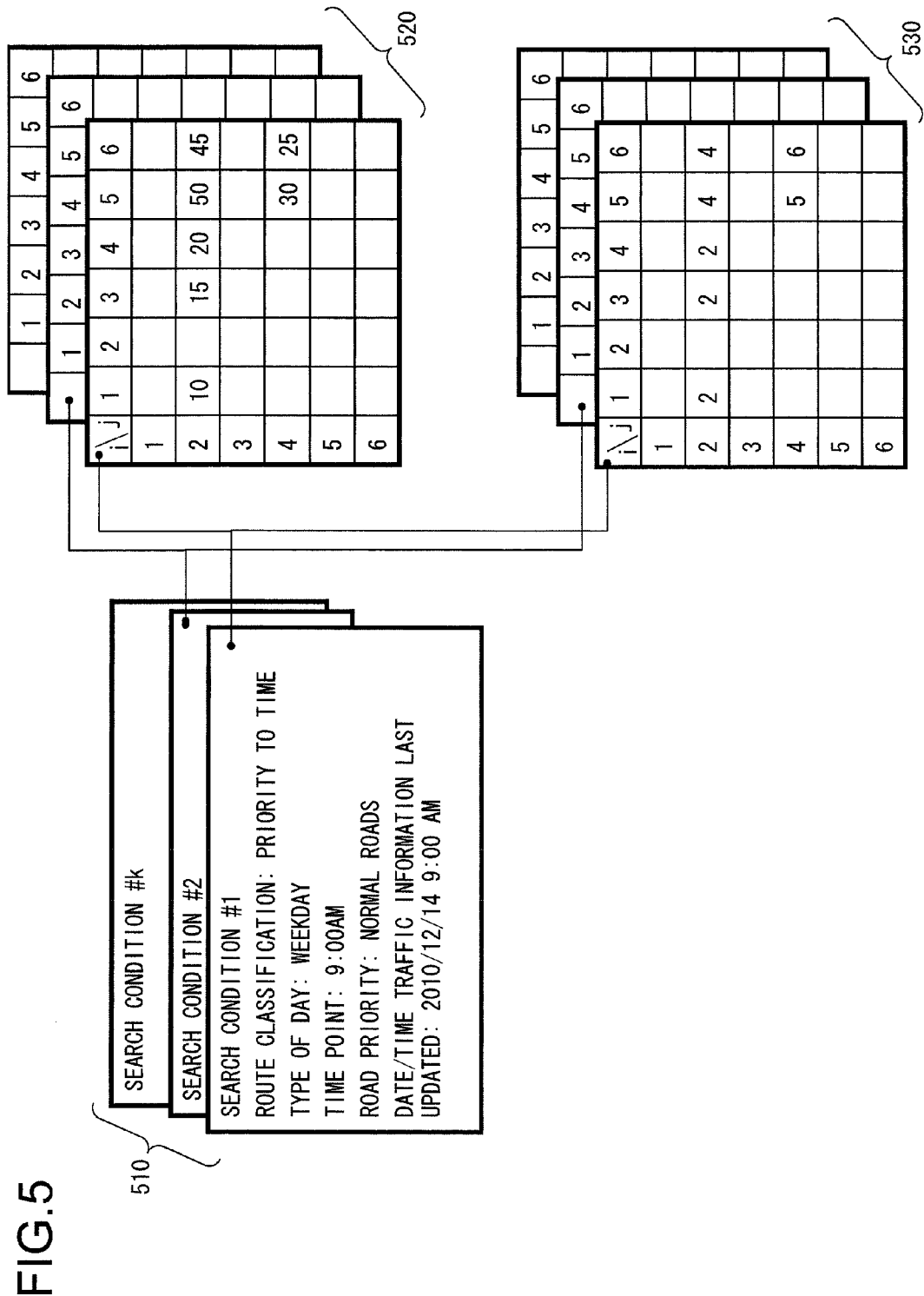
FIG. 5 is a figure showing an example of a data format for a confirmed route stored by a route information storage unit.

FIG. 5 is a figure showing an example of a data format for a confirmed route stored by the route information storage unit 18. The cost data 520 and the route data 530 of a confirmed route for search conditions 510 are shown. The cost data 520 is data for the cost required to travel from a departure node Ni to a target node Nj, and the type of cost may be the time required, the distance, the payment, the amount of fuel consumed, the amount of harmful substances emitted, or the like. The route information storage unit 18 takes as cost data the minimum cost of the route obtained by the route search unit 16 by calculating the route for which the cost of traveling between nodes becomes a minimum, and also takes this route as route data, and stores them both. The search conditions include items of various types, such as the route type, the type of day (e.g. weekday or weekend day) classified according to the date that the route is used, the departure date and time, the road priority, and so on, and a plurality of search conditions exist according to combinations of the setting details for these items. If traffic information is used in the route calculation, then time point information, for example the date and time of supply of the traffic information, is stored as identification information for the traffic information that has been used.

While with the present invention, by the route information storage unit 18 storing and keeping the route information, and by re-using this stored route information in route search with the same search conditions, it is taken as an objective to shorten the processing time by alleviating the burden of calculation related to route calculation, on the other hand, if traffic information is to be used, since the traffic information fluctuates from one moment to the next, it may not necessarily be effective to re-use the past route information. Thus, it is arranged for the route information storage unit 18 to store the date and time of supply of the traffic information along with the route information, and for the route information to be re-used within a predetermined time period range from the date and time of supply of the traffic information. It would also be acceptable to use statistical traffic information as the traffic information. Moreover, it will also be acceptable to use the date and time that the traffic information was updated as the time point information for identifying the traffic information, and, in this case, it may be arranged to re-use the past route information within a certain predetermined time period range from the above described date and time of updating the traffic information.

With regard to route information for which traffic information has been used, it is desirable to prevent such route information from becoming out of date by deleting it from the route information storage unit 18 at some timing included within a predetermined time period range from the date and time of updating of the above described traffic information, such as when the traffic information has been updated, when the calculated route information has been calculated with new traffic information, when a predetermined time interval has elapsed from when the route information was calculated, or the like. The date and time that the route information was calculated, in other words the date and time of generation of the route information, are obtained by the route search unit 16 referring to data appended to that route information and stored by the route information storage unit 18.

Figure 6:
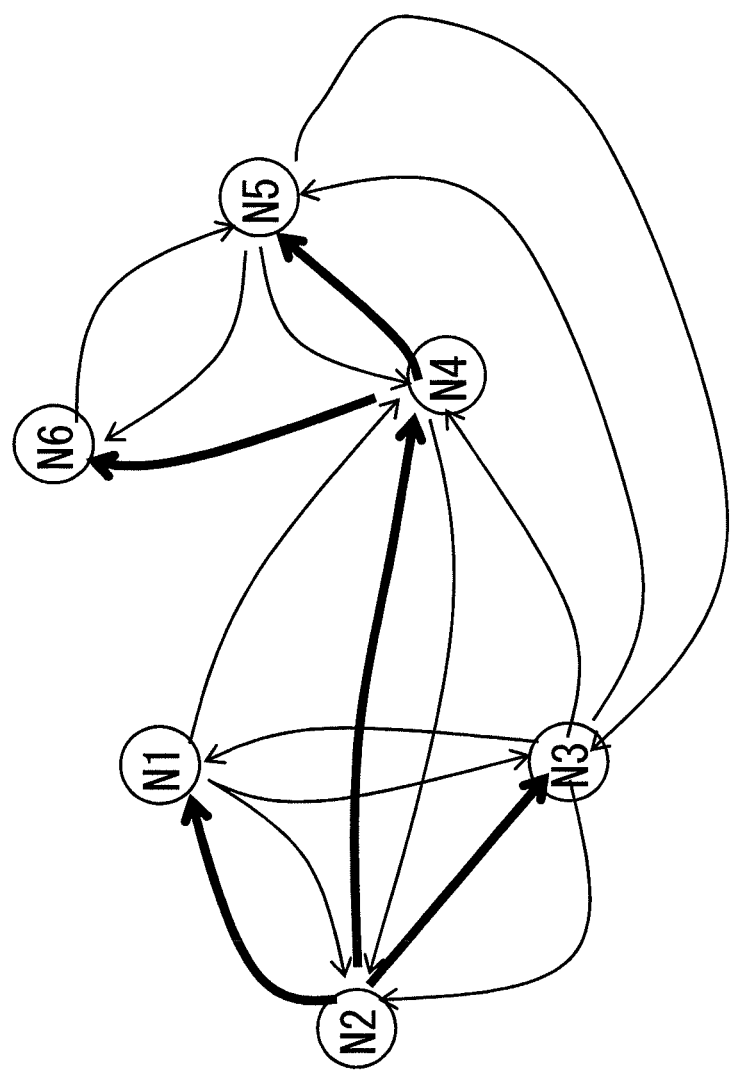
FIG. 6 is a figure showing an example of routes, for explanation of a method of referring to cost data and route data.

FIG. 6 is a figure showing an example of routes, for explanation of a method for referring to the cost data 520 and the route data 530 of FIG. 5. It will be supposed that a road network has been specified by nodes N1 through N6 as shown in FIG. 6. If the node N2 is taken as departure node, and routes from the node N2 to all of the remaining nodes are confirmed, then the costs of arrival at these various nodes are registered in the row i=2 of the cost data 520, while the routes from the departure node N2 to these nodes are registered in the route data 530. In relation to the route data 530, for example on the route from the node N2 to the node N6, the fact that the value n=4 is registered in the field i=2, j=6 means that the node Nn next to the departure node N2 is the node N4. Next, on the route from the node N4 to the node N6, the fact that the value n=6 is registered in the field i=4, j=6 means that the node Nn next to the node N4 is the node N6. Since the node N6 is the end point node, the route from the node N2 to the node N6 becomes N2→N4→N6.

Due to the step S211 of FIG. 2 being processed repeatedly, this time, the route condition setting unit 15 sets the node N4 as the departure node (the step S203), and the attained routes from the node N4 to the other nodes and their costs are calculated in the subsequent steps. In this case, since a route and a cost from the node N4 to the node N5 and a route and a cost from the node N4 to the node N6 are present in the cost data and the route data stored by the route information storage unit 18, accordingly in the step S208, without calculating these routes and costs over again, route calculation is performed by taking as subjects the target nodes N1, N2, and N3 for which routes from the node N4 are not confirmed. Furthermore, when the node N3 is taken as the departure node, then, when the candidate node N4 is selected in the process of searching for a route to the target node N6, since a route and a cost from the node N4 to the node N6 already exist, accordingly a route and cost from the departure node N3 to the target node N6 may be obtained by combining the route and the cost from the departure node N3 to the candidate node N4 and the confirmed route and the cost from the candidate node N4 to the target node N6. For example, the route from the departure node N3 to the candidate node N4 is constituted of N3→N1→N4, and the cost of this route is taken as being 15. And, since the confirmed route from the candidate node N4 to the target node N6 is constitute of N4→N6, and in the example shown in FIG. 5 the value of the cost of this confirmed route is 25, accordingly the entire route that is obtained by combining these routes is constitute of N3→N1→N4→N6, and the total cost of this route becomes 15+25=40. It should be understood that by a candidate node is meant a node that is selected, by the process of searching for a route from the departure node to the target node, as being a node to be passed through.

Figure 7:
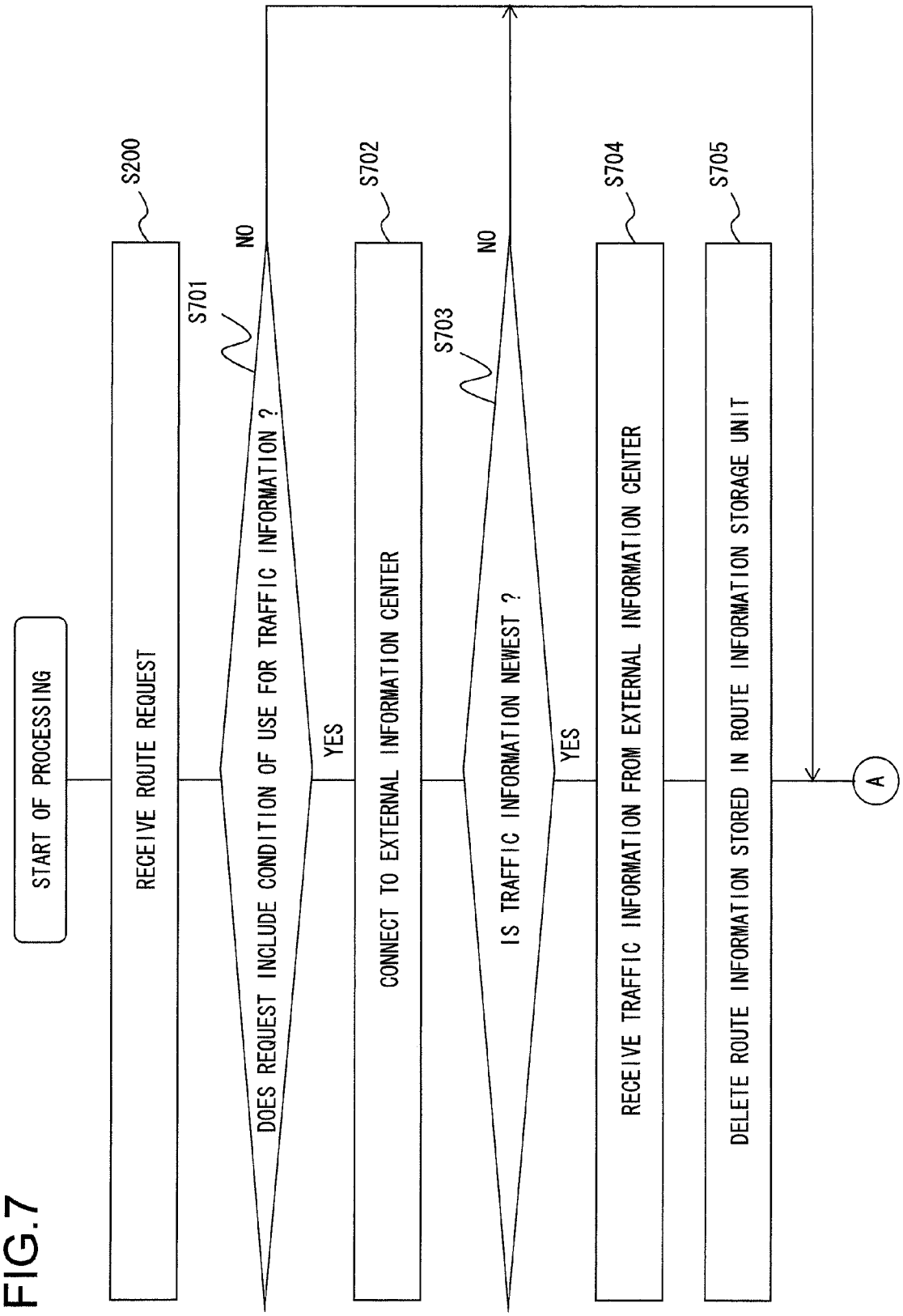
FIG. 7 is a figure showing an example of a flow of processing, in which processing related to traffic information is added to the overall processing flow of the route search system.

FIG. 7 is a figure showing an example of a processing flow, in which processing related to traffic information is added to the overall processing flow of the route search system explained in FIG. 2. First, the route request reception unit 14 makes a decision as to whether or not a request for utilization of traffic information is included in the search conditions included in the route request that was received in the step S200 (a step S701). If a request to use traffic information is included in the search conditions (YES in the step S701), then the route request reception unit 14 sets the date and time of the traffic information to be acquired by the external information acquisition unit 12 on the basis of the departure data and time that are included in these search conditions, and the external information acquisition unit 12 connects to the external information center 4 via the communication interface unit 11 (a step S702). If the date and time of updating of the traffic information held by the external information center 4 is newer than the date and time of updating of the traffic information stored in the external information storage unit 13 (YES in a step S703), then the external information acquisition unit 12 receives the newest traffic information from the external information center 4, and stores it in the external information storage unit 13 (a step S704). At this time, the route search unit 16 searches for the route information that was calculated using the traffic information whose date and time of updating is old, and deletes it from the route information stored in the route information storage unit 18. It should be understood that it would also be acceptable to arrange, when the processing of the step S704 is performed, for the route search unit 16 not to perform the processing of the step S705, but to leave the old traffic information stored just as it is in the route information storage unit 18.

If information for a plurality of time points other than the departure date and time, including the present time point and a future time point, is specified in the traffic information acquired from the external information center 4, then there will be a plurality of items of traffic information corresponding to this specified time point information. By the route search unit 16 estimating the time point that the route search system 1 passes through the subject area of the supplied traffic information on the basis of the straight line distance between the area that is the subject of supply of this traffic information and the departure point, it roughly estimates the predicted time point of passing through each of the points from the departure point, acquires traffic information on the basis of these predicted time points of passing through, and performs route calculation between the various points.

While, in the explanation given above, it was arranged for the traffic information used in route search by the route search system 1 of this embodiment to be acquired from the external information center 4, it would also be acceptable to arrange for past traffic information, or statistical traffic information calculated for each time of day on the basis of past traffic information, to be stored in advance in the storage device that stores the map data 19 and so on. In this case, it would also be acceptable for the above described search request to include search conditions for route search corresponding to the type of day.

Moreover, the information acquired from the exterior by the route search system 1 is not limited to being traffic information; in some cases, external information of various other types such as information about facilities, toll costs, tourism information or the like may be acquired and used in the route calculation. Such external information that is acquired from the external information center 4 is information that changes in a similar manner to traffic information, and, since the route information that has been calculated using this external information that changes loses its utility value at the time point that this external information is updated, accordingly it is necessary for it to be deleted from the route information storage unit 18.

Figure 8:
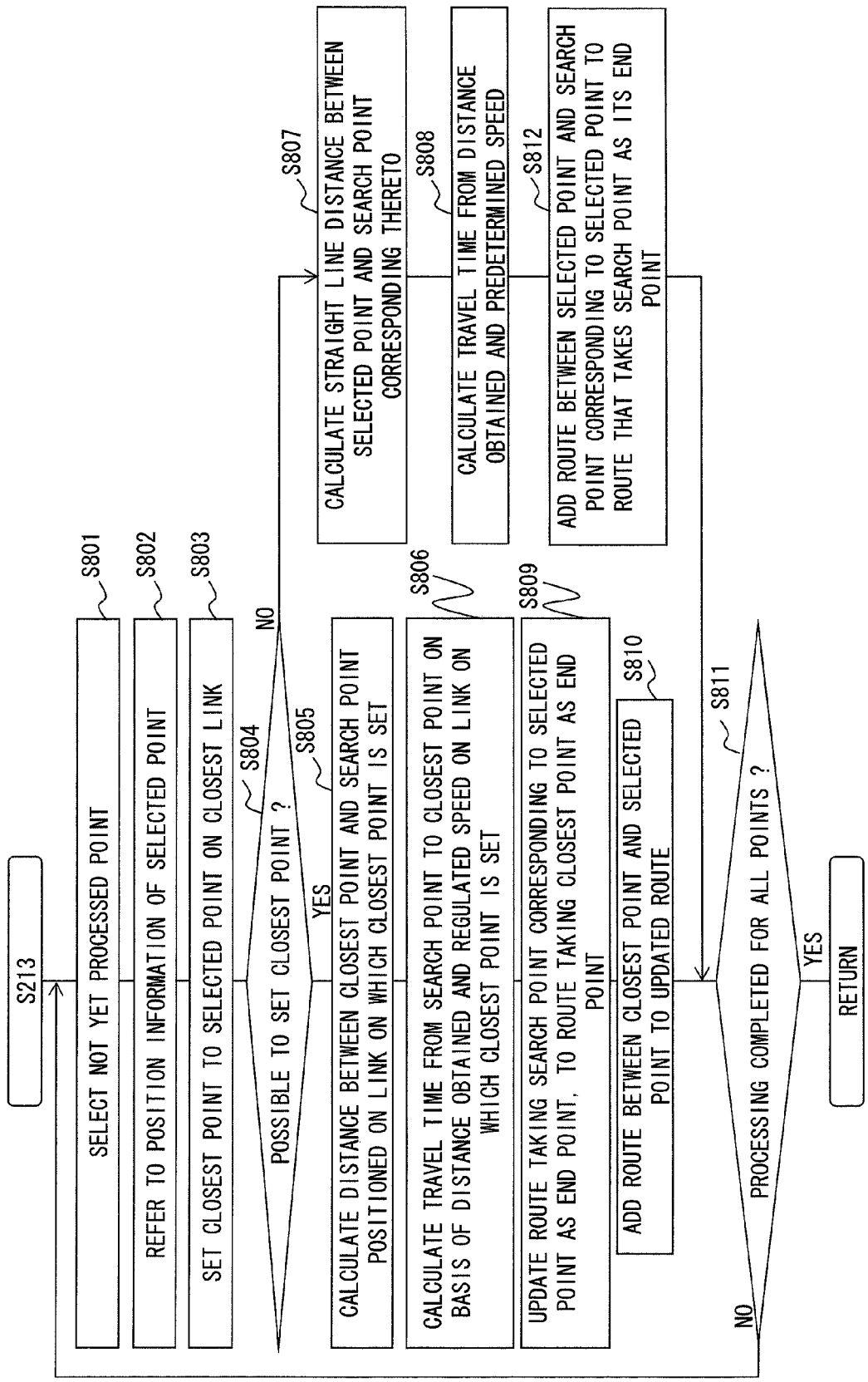
FIG. 8 is a figure showing an example of a processing flow for correction of route cost by a route search unit.
Figure 9:
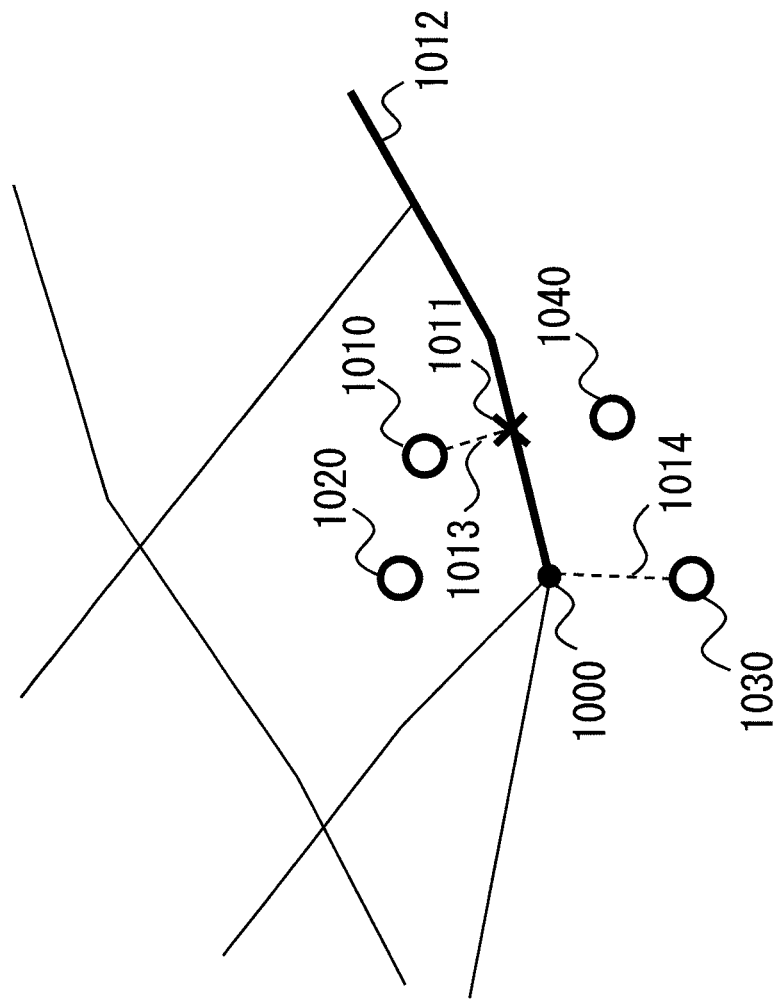
FIG. 9 is a figure showing an example of route correction for explanation of this processing flow for correction of route cost.

Then the route search unit 16 corrects the route cost in consideration of the distance from the search point that has been matched upon the roads of the map data 19, or from the link in which this search point is positioned, to each of the plurality of points that correspond to this search point. FIG. 8 is a figure showing an example of a processing flow for correction of route cost by the route search unit 16, and corresponds to the step S213 of FIG. 2. And FIG. 9 is a figure showing an example of route correction for explanation of this processing flow of FIG. 8 for correction of route cost.

The route costs obtained by route calculation by the route search unit 16 (such as the required time or the distance or the like) are the route costs between the search points that have been matched to road nodes on the map. The traveling costs between the points that correspond to those search points and those search points, or, if the search point is a summarized search point, the traveling costs between the various points included in the point group corresponding to this summarized search point and the search point (i.e. the summarized search point), are not included in these route costs. These traveling costs are, for example, the traveling cost between the point 1010 and the search point 1000 in FIG. 9, or the traveling costs between each of the points 1020 through 1040 and the search point 1000. There is no problem if the distance between the search point and the point that corresponds to this search point is extremely close, but the case must also be considered when the point corresponding to this search point is present at a position far from the road node that is set as the search point, or when, irrespective of any relationship to the distance, the link traveling cost between the search point and the point corresponding thereto is large due to traffic congestion or the like. Due to this, by this processing, the route search unit 16 estimates the traveling cost between those two points and corrects the route cost. As shown in the step S213 of FIG. 2, this correction processing is executed by the route search unit 16 directly before the step S214, after the calculation of routes between the plurality of points in the step S212 has ended.

The route search unit 16 selects a point that has not yet been processed from among the plurality of points (a step S801), and refers to the position information corresponding to the selected point (a step S802). And the route search unit 16 drops perpendiculars from this point to links in the neighborhood of this point, selects that link (termed the "closest link") for which the length of this perpendicular is shortest, and takes the point upon this selected closest link where the perpendicular intersects this selected closest link as being the closest point (a step S803). In the example shown in FIG. 9, if the point selected in the step S801 is the point 1010, then the closest link upon which the perpendicular 1013 drops is present within the predetermined range, and the closest point 1011 is set accordingly. However, if no closest link upon which a perpendicular drops is present within the predetermined range, as is the case when the point selected in the step S801 is the point 1030, so that it is not possible to set any closest point (NO in a step 804), then the route search unit 16 calculates the straight line distance that connects the point that was selected in the step S801 described above and the search point that corresponds to that point (a step S807), and calculates the travel time on the basis of the straight line distance obtained by this calculation and some predetermined speed (a step S808). In the example shown in FIG. 9, if the point 1030 has been selected in the step S801, then this straight line distance that is calculated in the step S807 is the length of the straight line 1014. It will be acceptable to arrange for the predetermined speed that is used in the calculation in the step S808 to be speed information for the surrounding links, in other words to be a regulated speed (i.e. a speed limit) or a speed obtained from traffic information or the like; or it could be a speed that is obtained by calculation from the link cost of the surrounding links. Or, for example, it would also be acceptable to arrange for it to be a speed that is obtained from past travel data for some vehicle, such as a probe car or the like. The route search unit 16 adds the route between this selected point and the search point, and the distance and the travel time of this route, respectively to that route, among all of the routes searched in the steps S211 and S212, that takes the search point corresponding to the point selected in the step S801 as its departure point or destination, and to the distance and the travel time of this route (a step S812), and then the flow of this processing is transferred to a step S811.

On the other hand, if it has been possible to set a closest point (YES in the step S804), then the route search unit 16 calculates the distance between this closest point and the search point that is positioned in the link upon which this closest point has been set (a step S805). And the route search unit 16 calculates the travel time from the search point to the closest point, on the basis of the distance obtained in the step S805 and speed information for the link upon which the closest point has been set, in other words information about regulated speed or information about speed obtained from traffic information, and the like (a step S806). Then, using the distance obtained in the step S805 and the travel time obtained in the step S806, the route search unit 16 corrects the route and the cost solved in the step S208 of FIG. 2 by performing the processing of steps S809 and S810. In the step S809, the route search unit 16 updates the route upon which the search point corresponding to the point that was selected in the step S801 is taken as being the end point, to a route upon which the closest point is taken as being the end point. In the example shown in FIG. 9, when the point 1010 is the subject selected, the route 1012 that is the subject for being updated and that takes the search point 1000 corresponding to this point 1010 as being its end point is updated to the route that takes the closest point 1011 on this route as being its end point. If the closest point is not present on the route that is the subject for being updated, then this update is performed by adding the route between the end point and the closest point to this route. This update is executed for all of the routes that take the point that was selected in the step S801 as the departure point or the destination. Then in the step S810 the route search unit 16 calculates the route from the closest point to the point that was selected in the step S801 and adds this route that it has calculated to the route that was updated in the step S809, thus performing processing to calculate the final route information. And the route search unit 16 repeats this processing until correction processing for all of the points has been completed (a step S811).

In this manner, the route information for the route that takes the closest point as its end point is calculated by subtracting (or adding) the travel time and the distance of the route between the closest point to the point that was selected in the step S801 and the search point from (or to) the travel time and the distance of the confirmed route that has been obtained by taking this search point as its departure point or destination node. In this embodiment, when no closest point can be searched, then in the steps S807, S808 and S812 the route information for the route from the point that was selected in the step S801 to the search point that corresponds to that point (or to the route upon the reverse direction) is included in the confirmed route information for that confirmed route, so that a route between the final points is generated. However, it would also be acceptable to arrange to perform correction for each of all of the points selected in the step S801, not by using the closest points, but by using the route information between these points and the search points corresponding to these points. At this time, the route information described above is acquired by searching for the closest distance between these points and the search points that correspond to these points, using more detailed map data. However, it would also be acceptable to arrange for the above described route information to be acquired by connecting these points and the search points corresponding to these points by straight lines, and by calculating the travel times and the straight line distances along these straight lines.

Second Embodiment

Figure 10:
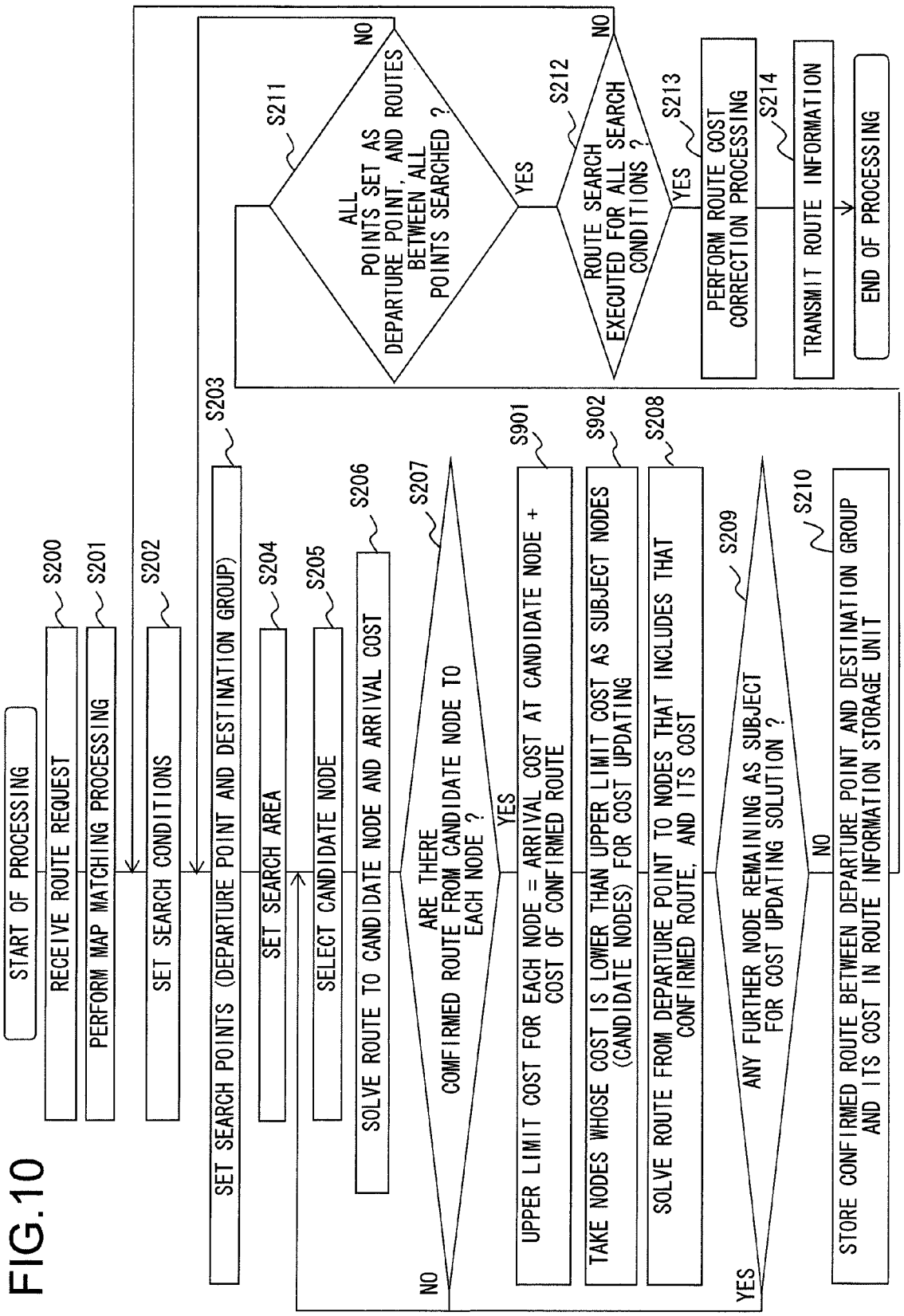
FIG. 10 is a flow chart showing operational steps by which a route search system according to a second embodiment of the present invention uses a route that has been confirmed in the past to reduce the number of subject nodes for searching.

In the following, a second embodiment of the present invention will be explained with reference to the drawings. FIG. 10 is a flow chart showing operational steps in this second embodiment of the present invention, in which the route search system 1 uses a route that has been confirmed in the past to reduce the number of subject nodes for searching.

Since the basic portion of the processing shown in FIG. 10 is the same as the processing shown in FIG. 2, the same reference numerals will be appended to steps that are common and explanation thereof will be omitted, with only the portions of the processing of FIG. 10 that are different from the processing of FIG. 2 being explained. If a confirmed route to the nodes taking the candidate node selected by the route search unit 16 as starting point exists (YES in the step S207), then the route search unit 16 sets an upper limit cost for each node on the basis of the arrival cost from the departure node to that candidate node and the cost of the confirmed route from that candidate node to the above described each node (a step S901). This upper limit cost for each node may be solved, for example, as the sum of the arrival cost at the candidate node and the cost of the above described confirmed route. While the cost of the confirmed route is managed as the cost data 520 shown in FIG. 5, in this embodiment, the route data 530 shown in FIG. 5 is not managed.

The route search unit 16 takes each node for which the arrival cost to the each node is smaller than the upper limit cost set for the each node as a subject node (a candidate node) for cost updating solution (a step S902). It becomes possible to shorten the time required for calculation by reducing the number of subject nodes for route calculation in this manner using the confirmed route, since the amount of computation related to route calculation is reduced. In the first embodiment, the confirmed route that was stored as confirmed data is included just as it is in the route that arrives from the departure point via the candidate node that corresponds to that confirmed route to the each node. However, in this embodiment, the route via the node within the upper limit cost range that have been narrowed down in number using the confirmed route is obtained by route calculation. In the step S210 of FIG. 10, along with performing this route calculation, the route that has been obtained by this route calculation is stored in the route information storage unit 18 as the route from the departure point that arrives at the each node of the destination group.

As has been explained above, with the route search systems 1 of the first and second embodiments of the present invention, route requests between all of the N points are received with a number of requests that is less than if requests were to be issued for each of all combinations of routes between the N points, and all of the route information between the N points is supplied to the delivery planning system 2 with a number of responses that is less than if responses were to be issued for each of all combinations of routes between the N points. Accordingly, it becomes possible to alleviate the processing load imposed upon an interface 110 between the route search system 1 and an application such as the delivery planning system 2 or the like that utilizes the route search system 1.

Moreover, with this route search system 1, in the process of searching a route between the N points, it is possible to reduce the amount of computation of route calculation by storing routes between nodes for which routes have been confirmed, and by utilizing these confirmed routes that have been stored in the calculation of routes that include new search points, so that it is possible to calculate a plurality of routes between N points in a shorter period of time than in the prior art.

The above described embodiments are examples, and various modifications can be made without departing from the scope of the invention.

What is claimed is:

1. A route search system a reception unit that receives a search request for a plurality of first routes, that are routes between all the combinations of two of a plurality of points; a search unit that, when the search request is received by the reception unit, searches the plurality of first routes based upon a search condition included in the search request; a supply unit that transmits route information for the plurality of first routes searched by the search unit; wherein both a number of times the search request is received by the reception unit, and a number of times route information is transmitted by the supply unit, are smaller than a number of points in the plurality of points; comprising:

a storage unit that, when each route of the plurality of first routes are searched by the search unit, stores route correspondence information related to a second route, that is either a route section from a first candidate node through which the each route of the first routes passes to a second candidate node through which the each route of the first routes passes, or a route section from the first candidate node to a destination of the each route of the first routes, in correspondence with the search condition;

wherein the search unit, after the route correspondence information has been stored by the storage unit, and when the each route of the plurality of the first routes is searched by the search unit and the each route of the plurality of the first routes include a second route, refers to the storage unit and searches the route correspondence information and searches for the plurality of first routes based upon the search condition and the route correspondence information.

2. The route search system according to claim 1, further comprising
an acquisition unit that acquires a departure date and time and traffic information from an external server, and wherein
the search condition includes a condition that the plurality of first routes are searched based upon the traffic information corresponding to the departure date and time.

3. The route search system according to claim 2, wherein:
the acquisition unit, along with acquiring the traffic information corresponding to the departure date and time, acquires the traffic information corresponding to a predicted time point of passing through each point of the plurality of the points; and
the search condition includes a condition that the plurality of first routes are to be searched based upon the traffic information corresponding to the departure date and time and the traffic information corresponding to the predicted time point of passing through the each point of the plurality of points.

4. The route search system according to claim 3, further comprising
a deletion unit that, when the traffic information corresponding to the departure date and time has been acquired by the acquisition unit, deletes the route correspondence information stored by the storage unit; and wherein
the storage unit newly stores the second route in correspondence with the search condition.

5. The route search system according to claim 3, wherein the traffic information includes statistical traffic information.

6. The route search system according to claim 5, wherein:
the statistical traffic information is structured according to type of day; and
the search condition includes a condition that the plurality of first routes are searched based upon the statistical traffic information structured according to the type of day.

7. The route search system according to claim 1, wherein:
the search condition includes a plurality of conditions including a road classification condition, a road width condition, and a number of road lanes condition;
the search unit searches for the second route that corresponds to each condition of the plurality of conditions; and
the search unit searches for the plurality of first routes based upon the each condition.

8. The route search system according to claim 1, wherein:
the route correspondence information includes second route cost information for the second route; and
the search unit, based upon the search condition and the route correspondence information, along with searching for the plurality of first routes, solves a first route cost for the each route of the plurality of first routes.

9. The route search system according to claim 8, wherein:
the route correspondence information includes the second route and cost information for the second route; and
the search unit solves a third route for a section from a departure point of the each route of the plurality of first routes to the first candidate node and a third route cost of the third route based upon the search condition and the route correspondence information, and, based upon the second route and the second route cost information for the second route and based upon the third route and the third route cost for the third route, along with searching for the plurality of first routes, solves the first route cost for the each route of the plurality of the first routes.

10. The route search system according to claim 1, further comprising
a correspondence establishment unit that establishes correspondence between the plurality of points and a plurality of road nodes respectively; and wherein
the search unit, based upon the search condition, along with searching for a fourth route between two of the plurality of road nodes, searches for a fifth route from a point established in correspondence with each node of the two nodes by the correspondence establishment unit to a link on which the each node is positioned or to the each node, and, by correcting the fourth route based upon the fifth route, along with searching for each of the plurality of first routes, solves a cost of the each of the plurality of first routes.

11. The route search system according to claim 10, wherein the correspondence establishment unit establishes a correspondence to one road node of a portion of the plurality of points, which are close to one another.

* * * * *